(12) United States Patent
Bartolucci et al.

(10) Patent No.: US 10,373,111 B2
(45) Date of Patent: Aug. 6, 2019

(54) CHIP CARD IMAGING AND VERIFICATION SYSTEM

(71) Applicant: Bank of America Corporation, Charlotte, NC (US)

(72) Inventors: Eric Justin Bartolucci, Charlotte, NC (US); Wynton S. Taylor, Charlotte, NC (US); Murali Sampath, Flower Mound, TX (US); Kirubel Getachew, Garland, TX (US)

(73) Assignee: Bank of America Corporation, Charlotte, NC (US)

( * ) Notice: Subject to any disclaimer, the term of this patent is extended or adjusted under 35 U.S.C. 154(b) by 233 days.

(21) Appl. No.: 15/420,643

(22) Filed: Jan. 31, 2017

(65) Prior Publication Data

US 2018/0218313 A1    Aug. 2, 2018

(51) Int. Cl.
*G06Q 20/36* (2012.01)
*G06Q 10/08* (2012.01)

(52) U.S. Cl.
CPC ................. *G06Q 10/087* (2013.01)

(58) Field of Classification Search
CPC .............................. G06Q 20/36; G06Q 10/00
USPC ........................................ 705/26.8, 39, 41
See application file for complete search history.

(56) References Cited

U.S. PATENT DOCUMENTS

| | | | |
|---|---|---|---|
| 7,652,268 B2* | 1/2010 | Patel | G01T 1/04 250/472.1 |
| 9,077,828 B1 | 7/2015 | Koster | |
| 9,727,816 B1* | 8/2017 | Strater, Jr. | G06K 7/0004 |
| 2001/0034717 A1* | 10/2001 | Whitworth | G06Q 20/341 705/64 |
| 2002/0133467 A1* | 9/2002 | Hobson | G06Q 20/02 705/64 |
| 2007/0057052 A1* | 3/2007 | Goldstein | G06K 17/00 235/436 |
| 2007/0198287 A1* | 8/2007 | Outwater | G06Q 10/06 382/115 |
| 2008/0023647 A1* | 1/2008 | Patel | G01T 1/04 250/473.1 |
| 2014/0143089 A1* | 5/2014 | Campos | G06Q 20/36 705/26.8 |
| 2014/0195425 A1* | 7/2014 | Campos | G06Q 20/20 705/41 |
| 2015/0012339 A1* | 1/2015 | Onischuk | G07C 13/00 705/12 |

(Continued)

*Primary Examiner* — Oluseye Iwarere
(74) *Attorney, Agent, or Firm* — Michael A. Springs (57) ABSTRACT

A system includes a vision system, a database, a chip reader, and a computer system. The computer system accesses an image of a two-dimensional barcode captured by the vision system and determines barcode information for a group of cards. The barcode information comprises a chip expiration date that applies to the cards in the group of cards. The computer system accesses particular chip information read by the chip reader for a particular card of the group of cards and verifies that the particular chip information matches the barcode information. The computer system updates the database to include the chip expiration date for the group of cards. The computer system analyzes a plurality of chip expiration dates stored in the database and determines, based on the analysis, an order in which to pull groups of cards from inventory in order to issue cards to users.

20 Claims, 3 Drawing Sheets

(56) References Cited

U.S. PATENT DOCUMENTS

2015/0076225 A1* 3/2015 Sweeney .............. G06K 7/1408
235/380
2016/0232820 A1* 8/2016 Koltchine ................. G09F 3/10
2017/0345234 A1* 11/2017 Getachew .......... G07C 9/00007

* cited by examiner

CHIP CARD IMAGING AND VERIFICATION SYSTEM

TECHNICAL FIELD

The present disclosure relates generally to imaging, and more specifically to a chip card imaging and verification system.

BACKGROUND

Cards such as credit cards and debit cards are produced by various suppliers and then shipped to institutions who then issue the cards to users. In addition to or in place of a magnetic strip, some cards may include an integrated circuit ("chip") to store information about the card or user. Chips, however, typically only have a limited amount of usable time before they expire. When a chip expires, the card in which it is embedded is no longer usable and must be replaced.

SUMMARY

In some embodiments, a system includes a vision system, a database, a chip reader, and one or more computer systems. The one or more computer systems are operable to access an image of a two-dimensional barcode captured by the vision system. The barcode is associated with a first group of cards, and each card of the first group of cards comprises a chip operable to store chip information about the first group of cards. The one or more computer systems are further operable to determine, using the image of the two-dimensional barcode, barcode information for the first group of cards. The barcode information comprises at least a first chip expiration date that applies to all of the cards in the first group of cards. The one or more computer systems are further operable to access particular chip information read by the chip reader for a particular card of the first group of cards and determine whether the accessed particular chip information matches the barcode information from the two-dimensional barcode. The one or more computer systems are further operable to update the database to include the first chip expiration date for the first group of cards if it is determined that the accessed particular chip information read by the chip reader for the particular card matches the barcode information from the two-dimensional barcode. In some embodiments, the one or more computer systems are further operable to analyze a plurality of chip expiration dates stored in the database. Each chip expiration date is associated with a particular group of cards from a plurality of groups of cards stored in inventory. In some embodiments, the one or more computer systems are further operable to determine, based on the analysis of the chip expiration dates stored in the database, an order in which to pull the plurality of groups of cards from the inventory in order to issue cards to users.

The disclosed embodiments present several technical advantages. In some embodiments, a card imaging and verification system provides increased card inventory control and card issuing performance using two-dimensional (2D) barcodes. Using 2D barcodes may reduce read errors and the frequency of manual interventions, and thereby increase the efficiency and throughput rate of the card imaging and verification system. In some embodiments, information associated with a chip within a card may be accessed, verified, and stored using 2D barcodes. Using 2D barcodes for chip information protects the security of the card information while making the chip information accessible, for example, when diagnosing and resolving issues with a card. One or more security protocols may be employed to protect chip information associated with a card. Chip information may be combined with card information and securely communicated across a network.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Cards such as credit cards and debit cards are produced by suppliers and then shipped to various institutions where they are ultimately issued to end users or customers. In addition to or in place of a magnetic strip, some cards now include an integrated circuit ("chip") to store information about the card and/or user. However, these cards, also known as "EMV cards" or "smart cards," may create multiple problems for institutions who issue the cards to users. For example, chips typically only have a limited amount of usable time before they expire. When a chip expires, the EMV card in which it is embedded is no longer usable and must be replaced. This may create internal production issues for institutions that issue EMV cards due to the possibility of cards sitting in inventory too long before they are issued. As another example, EMV cards typically create additional compliance issues for institutions because many governments have issued new regulations pertaining to these types of cards.

Because of these and other issues related to EMV cards, it is important for institutions to track inventory of new cards from suppliers and to capture vital information from chips embedded in the cards. It is especially important to track card inventory and capture chip information before cards are personalized and before the cards are issued to users. However, a current lack of standardized chip information in the market has created a challenge to automate the inventory management process within card issuing institutions. As a result, card issuing institutions remain vulnerable to regulatory/compliance issues, internal production issues, and impact to customers who use such cards.

To address these and other issues related to EMV cards, embodiments of the disclosure include a barcode such as a two-dimensional ("2D") Quick Response ("QR") code that includes certain vital chip information such as expiration date, vendor chip type, vendor production information, etc. In some embodiments, the barcode may be placed on a label on a sleeve of cards arriving from a supplier who produced the cards. Upon receipt of the sleeve of cards from each supplier, the barcode may be scanned by a card imaging and verification system and the chip information from the barcode may be automatically uploaded into a database. In addition, one or more cards from a sleeve may be sampled by the card imaging and verification system using a chip reader in order to validate the information from the chip with the information from the barcode.

In addition, some embodiments may additionally analyze chip expiration dates stored in the database. In some embodiments, these expiration dates are each associated with a particular sleeve/group of cards that are physically stored in inventory. Some embodiments may also determine, based on the analysis of the chip expiration dates in the database, an order in which to pull the sleeves/groups of cards from inventory in order to issue cards to users. Particular embodiments may follow a first in, first out ("FIFO") method for pulling the cards from inventory in order to reduce waste associate with expired chips.

EMV cards present several technical problems and challenges for institutions that issue such cards to customers. For example, as described above, chips in EMV cards have expiration dates that cause the card to become unusable after the expiration date passes. In addition, because multiple batches of cards may have chips with different expiration dates, and the fact that some institutions issue millions of cards per year that are produced by multiple different suppliers, tracking the inventory of such cards becomes increasing challenging and important. A card imaging and verification system according to disclosed embodiments is configured to obtain and use information from barcodes such as 2D QR codes in order to provide a technical solution to these and other technical problems. By using 2D barcodes, the card imaging and verification system provides increased card inventory control and card issuing performance by reducing read errors and the frequency of manual interventions, thereby increasing the efficiency, accuracy, and throughput rate of the card imaging and verification system.

Figure 1:
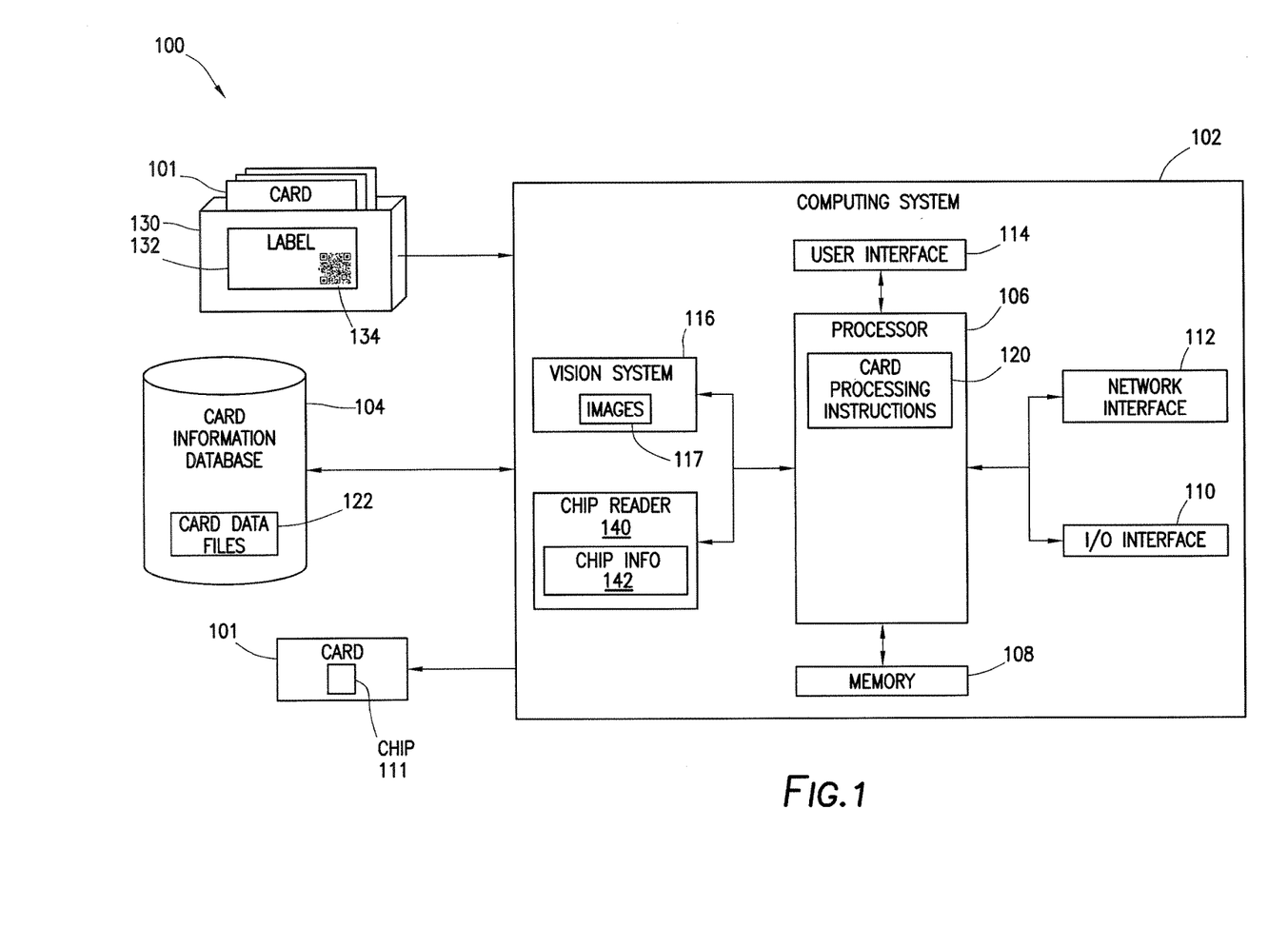
FIG. 1 is a schematic diagram of a chip card imaging and verification system, according to certain embodiments.
Figure 2:
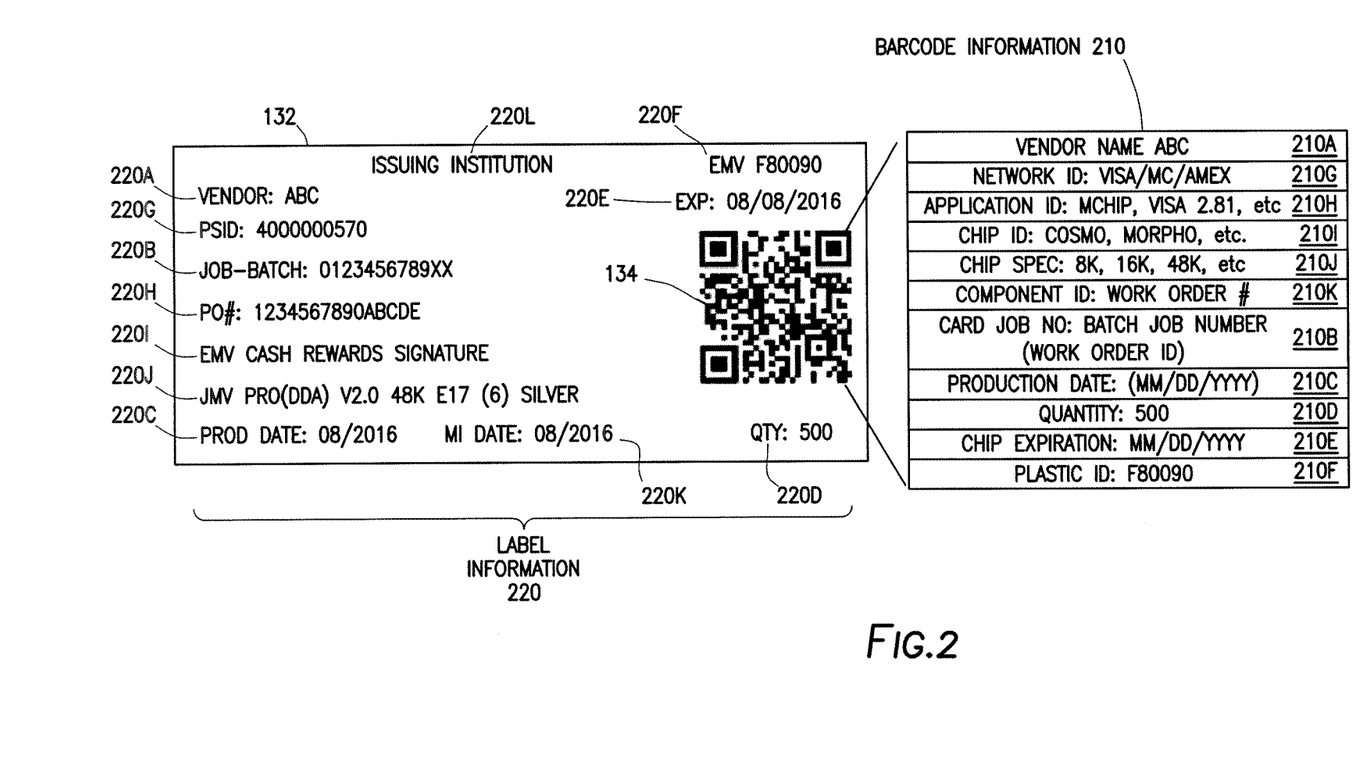
FIG. 2 is an illustration of a card sleeve label that may be used by the card imaging and verification system of FIG. 1, according to certain embodiments.
Figure 3:
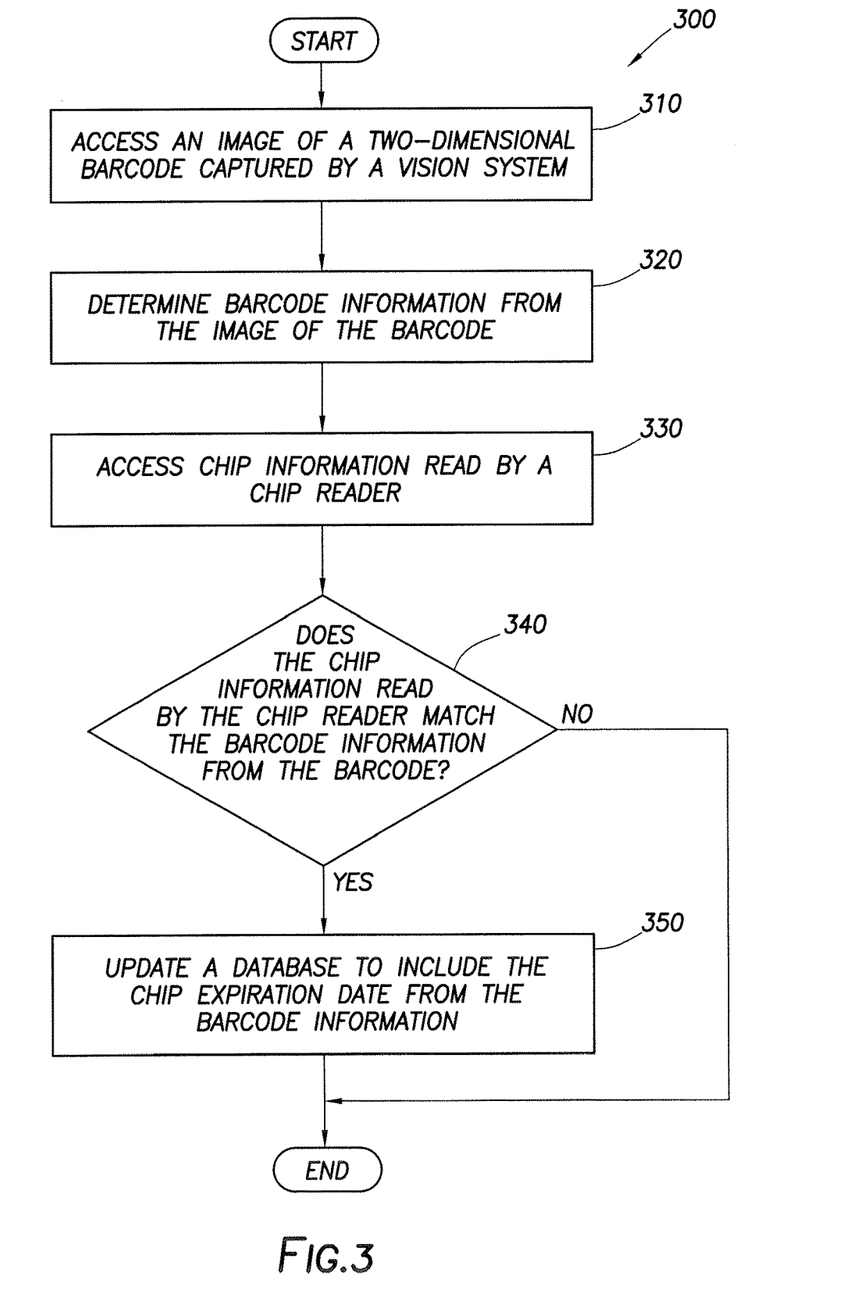
FIG. 3 is a flowchart of a card imaging and verification method, according to certain embodiments.

Embodiments of the card imaging and verification system will be described in more detail using FIGS. 1 through 3. FIG. 1 generally illustrates a schematic diagram of an embodiment of a card imaging and verification system. FIG. 2 illustrates a card sleeve label that may be used by the card imaging and verification system of FIG. 1. FIG. 3 illustrates an example card imaging and verification method.

FIG. 1 is a schematic diagram of a card imaging and verification system 100, according to certain embodiments. Card imaging and verification system 100 may include a computing system 102 and a card information database 104. Computing system 102 may include a vision system 116 that captures images 117 and a chip reader 140 that captures chip information 142 from chips 111 within cards 101. Card imaging and verification system 100 may be configured as shown or in any other suitable configuration. For example, card information database 104 may be incorporated or integrated with computing system 102. As another example, vision system 116 and chip reader 140 may be external to computing system 102.

In general, card imaging and verification system 100 processes multiple groups or "sleeves" 130 of cards 101 that are received from multiple suppliers in order to place them into inventory and determine an order in which to issue cards 101. Each card sleeve 130 may include a sleeve label 132 that includes a barcode 134. Card imaging and verification system 100 may access an image 117 of barcode 134 that is captured by vision system 116 and then determine, from the captured image 117 of barcode 134, barcode information 210 (e.g., 210A-210K) for chips 111 within cards 101 of card sleeve 130. Barcode information 210, which is described in more detail below with respect to FIG. 2, may contain an expiration date 210E for chips 111 within cards 101 of card sleeve 130. Card imaging and verification system 100 may then store a portion or all of barcode information 210, including expiration date 210E, in card information database 104. In some embodiments, card imaging and verification system 100 additionally accesses chip information 142 that is read from a particular chip 111 within card sleeve 130 using chip reader 140. Card imaging and verification system 100 may then compare chip information 142 from chip reader 140 to barcode information 210 in order to verify barcode information 210. Further operations of card imaging and verification system 100 are discussed in more detail below.

Cards 101 may be any type of cards that are issued to users and/or customers. For example, cards 101 may include, but are not limited to, credit cards, debit cards, pre-paid card, and gift cards. Cards 101 include one or more chips 111. Chip 111 may be any type of integrated circuit or microprocessor chip that is embedded within card 101 that is capable of storing chip information 142.

Computing system 102 may include a processor 106, a memory 108, an input/output (I/O) interface 110, a network interface 112, a user interface 114, vision system 116, and chip reader 140. Processor 106 may be implemented as one or more central processing unit (CPU) chips, logic units, cores (e.g. as a multi-core processor), field-programmable gate arrays (FPGAs), application specific integrated circuits (ASICs), or digital signal processors (DSPs). Processor 106 is operably coupled to and in signal communication with memory 108, I/O interface 110, network interface 112, user interface 114, vision system 116, and chip reader 140. Processor 106 is configured to receive and transmit electrical signals among one or more of memory 108, I/O interface 110, network interface 112, user interface 114, vision system 116, and chip reader 140. Processor 106 may be operably coupled to one or more other devices (not shown). Processor 106 is configured to process data and may be implemented in any hardware or software.

Processor 106 may be configured to implement card processing instructions 120. In FIG. 1, card processing instructions 120 are implemented as instructions (e.g. software code or firmware) stored in processor 106. In other embodiments, card processing instructions 120 may be implemented as instructions stored in memory 108. The inclusion of card processing instructions 120 provides an improvement to the functionality of computing system 102 and card imaging and verification system 100, which effects a transformation of the computing system 102 and card imaging and verification system 100 to a different state. Card processing instructions 120 are implemented by processor 106 to execute instructions and methods described herein for processing cards 101. For example, executing card processing instructions 120 may configure processor 106 to execute the instructions and steps as describe below with respect to FIG. 3.

Memory 108 may include one or more disks, tape drives, or solid-state drives, and may be used as an over-flow data storage device, to store programs when such programs are selected for execution, and to store instructions and data that are read during program execution. Memory 108 may be volatile or non-volatile and may comprise read-only memory (ROM), random-access memory (RAM), ternary content-addressable memory (TCAM), dynamic random-access memory (DRAM), and static random-access memory (SRAM). Memory 108 is operable to store system information, user information, card information, and/or any other data or instructions (e.g. card processing instructions 120).

I/O interface 110 may include ports, transmitters, receivers, transceivers, or any other devices for transmitting and/or receiving data as would be appreciated by one of ordinary skill in the art upon viewing this disclosure. For example, I/O interface 106 may be configured to communicate data between processor 106 and peripheral hardware such as a mouse, a keyboard, or a touch sensor (e.g. a touch screen).

Network interface 112 may be configured to enable wired and/or wireless communications and to communicate data through a network, system, and/or domain. For example, network interface 112 may comprise or may be integrated with a modem, a switch, a router, a bridge, a server, or a client. Processor 106 may be configured to send and to receive data using network interface 112 from a network or a remote source.

User interface 114 may be configured to present information to a user using the computing system 102. For example, user interface 114 may comprise a graphical user interface (GUI). The GUI may be employed to provide interfaces that allow the operator to view and interact with programs executed on computing system 102. Examples of user interface 114 include, but are not limited to, touch screens, a light emitting diode (LED) display, an organic LED (OLED) display, an active matric OLED (AMOLED), a projector display, a cathode ray (CRT) monitor, or any other suitable type of display as would be appreciated by one of ordinary skill in the art upon viewing this disclosure.

In some embodiments, card imaging and verification system 100 may be configured to process and issue cards 101 to users and/or customers. An operator may employ card imaging and verification system 100 to process a card 101 to be issued to a card user. For example, an operator may generate and/or send a card request to the card imaging and verification system 100 to request a card 101 to be processed for issuing to a card to a user. Card imaging and verification system 100 is configured to output a processed card 101 to the operator in response to the card request. The processed card 101 may be configured for a particular card user based on the card request. For example, the card 101 may be encoded, personalized, programmed, and/or stylized for a particular card user. Cards 101 may be obtained by card imaging and verification system 100 from a card repository comprising a plurality of different types of cards 101. For example, computing system 102 may be configured to customize a card 101 to be issued to a card user. Examples of operations performed by the computing system 102 include, but are not limited to, card retrieval, barcode scanning, vision verification, magnetic strip encoding, integrated chip programming, graphics or logo printing, laser etching, laminating, top coating, embossing, and label affixing. In some embodiments, credentials may be utilized by computing system 102 to authenticate the operator. For example, computing system 102 may receive credentials from a particular user and then authenticate the particular user based on the credentials.

Vision system 116 may be configured to capture images 117 or other visual information from cards. Vision system 116 may include a camera, a barcode reader or scanner (e.g. a 2D barcode reader), and/or any other devices for capturing visual information from cards 101 as would be appreciated by one of ordinary skill in the art upon viewing this disclosure. For example, vision system 116 may include a camera and may be configured to capture images 117 of the faces or individual features (e.g. barcode 134) of a card 101. In another example, vision system 116 may include a barcode reader/scanner and may be configured to scan barcode 134 on a card 101. In some embodiments, vision system 116 may be configured to store and process captured visual information or images 117. For example, vision system 116 may include a DSP or microprocessor. In some embodiments, vision system 116 may be configured to send the captured visual information or images 117 to processor 106 for processing.

Chip reader 140 may be any appropriate device or system that is capable of reading chip information 142 from chip 111. In some embodiments, chip reader 140 may physically contact chip 111 in order to read chip information 142. In other embodiments, chip reader 140 may utilize a wireless technology such as RFID in order to read chip information 142 from chip 111. In some embodiments, chip reader 140 may be configured to process and/or store captured chip information 142. For example, chip reader 140 may include a DSP or microprocessor and any appropriate memory devices. In some embodiments, chip reader 140 may be configured to send the captured chip information 142 to processor 106 for processing.

Card information database 104 is communicatively coupled to computing system 102. Card information database 104 may be configured to store card data files 122 and to provide card data files 122 to computing system 102. Card data files 122 may store any type of information for a particular card 101 or group of cards such as card sleeve 130. In some embodiments, card data files may store any or all of chip information 142, barcode information 210, and/or any other type of information as would be appreciated by one of ordinary skill in the art upon viewing this disclosure. In one embodiment, card information database 104 may be external to computing system 102. For example, card information databases 104 may be in a different geographic location than computing system 102 and may be communicatively coupled to computing system 102 using a network connection. In another embodiment, card information database 104 may be integrated with computing system 102.

Barcode 134 is any type of machine-readable optical label that contains information about chip 111 and/or card 101. In some embodiments, barcode 134 is a 2D barcode such as a QR, Datamatrix, PDF417, or Aztec barcode. In other embodiments, barcode 134 is a one-dimensional ("1D") barcode such as a UPC, EAN, Code 39, Code 128, ITF, Code 93, CodaBar, GS1 DataBar, or MSI Plessey barcode. While specific examples of barcode 134 have been listed, it should be understood that barcode 134 may be any type of machine-readable code either currently available or yet to be created.

Chip information 142 is any appropriate information stored in chip 111 about a user, an account, chip 111, card 101, and the like. For example, chip information 142 may include specifications about chip 111 (e.g., an expiration date). In some embodiments, chip information 142 includes any or all of barcode information 210 or label information 220 (e.g., 220A-220L).

FIG. 2 is an illustration of a sleeve label 132 that may be used by card imaging and verification system 100 of FIG. 1. In some embodiments, sleeve label 132 includes label information 220 and barcode 134. Label information 220 and barcode 134 may be printed on or otherwise affixed to sleeve label 132 in any appropriate manner. While a specific embodiment of label 132 is illustrated in FIG. 2, it should be understood that label information 220 and barcode 134 may be in any configuration, may be in any location, and may have any visual appearance on label 132.

In some embodiments, barcode information 210 may include one or more of the following:
- a vendor name or logo 210A, which may be the name, logo, or any appropriate abbreviation of a vendor/supplier who produced cards 101 within card sleeve 130 (e.g., "ABC");
- a job or batch number 210B associated with production of cards 101 within card sleeve 130 (e.g., "0123456789XX");
- a production date 210C when cards 101 within card sleeve 130 were produced (e.g., "MM/DD/YYYY");
- a quantity 210D of cards 101 included within card sleeve 130 (e.g., "500");
- an expiration date 210E of the chips 111 of the cards 101 included within card sleeve 130 (e.g., "MM/DD/YYYY");
- an internal plastic number 210F (e.g., "F80090");
- a network identification 210G associated with the chips 111 of the cards 101 included within card sleeve 130 (e.g., VISA/MC/Amex);
- an application identification 210H associated with the chips 111 of the cards 101 included within card sleeve 130 (e.g., MCHIP, VISA 2.81, etc.);
- a chip identification 210I associated with the chips 111 of the cards 101 included within card sleeve 130 (e.g., Cosmo, Morpho, etc.);
- a chip specification 210J associated with the chips 111 of the cards 101 included within card sleeve 130 (e.g., 8K, 16K, 48K, etc.); and
- a component ID or work order number 210K associated with cards 101 within card sleeve 130.

In some embodiments, label information 220 may include one or more of the following:
- a vendor name or logo 220A, which may be the name, logo, or any appropriate abbreviation of a vendor/supplier who produced cards 101 within card sleeve 130 (e.g., "ABC");
- a job or batch number 220B associated with production of cards 101 within card sleeve 130 (e.g., "0123456789XX");
- a production date 220C when cards 101 within card sleeve 130 were produced (e.g., "08/2016");
- a quantity 220D of cards 101 included within card sleeve 130 (e.g., "500");
- an expiration date 220E of the chips 111 of the cards 101 included within card sleeve 130 (e.g., "8/8/2016");
- an internal plastic number 220F (e.g., "F80090");
- a shelf number 220G associated with a storage location in inventory for the cards 101 within card sleeve 130 (e.g., "4000000570");
- a purchase order number 220H associated with an order for the card sleeve 130 (e.g., "1234567890ABCDE");
- a written description 220I of the cards 101 within card sleeve 130 (e.g., "Cash Rewards Signature");
- chip data 220J that indicates an application version of the chips 111 of the cards 101 of card sleeve 130 and/or a data authentication component for the chips 111 of the cards 101 of card sleeve 130 (e.g., "JMV PRO(DDA) V2.0 48K E17 (6) Silver");
- a date 220K when the chips 111 within card sleeve 130 were milled into the cards 101 of card sleeve 130 (e.g., "08/2016"); and
- a name or logo 220L of the institution issuing the card 101 (e.g., "ISSUING INSTITUTION").

In operation, computing system 102 provides imaging, verification, and inventory operations for card sleeves 130 received from multiple suppliers. To do so, computing system 102 may first access an image 117 of barcode 134 captured by vision system 116 to determine barcode information 210. In other embodiments, barcode information 210 is determined using a barcode scanner 116. After determining barcode information 210, computing system 102 may store some or all of barcode information 210 in card information database 104 (e.g., within card data files 122). In some embodiments, computing system 102 may first verify barcode information 210 before storing it in card information database 104. For example, computing system 102 may access particular chip information 142 read by chip reader 140 for a particular card 101 of the first card sleeve 130. If computing system 102 determines that the particular chip information 12 read by chip reader 140 for the particular card 101 matches the barcode information 210 from barcode 134, computing system 102 may proceed to store some or all of barcode information 210 in card information database 104.

In some embodiments, computing system 102 provides inventory control operations for card imaging and verification system 100. For example, computing system 102 may automatically monitor chip expiration dates 210E of card information database 104 to determine an order in which to pull cards 101 from inventory for issuance to customers. In some embodiments, computing system 102 may utilize a FIFO method for cards 101 in order to minimize the possibility of chips 111 expiring before cards 101 are issued. In some embodiments, computing system 102 may do so by analyzing a plurality of chip expiration dates 210E stored in card information database 104. Computing system 102 may automatically monitor expiration dates 210E in any appropriate interval (e.g., one per hour, day, week, month, etc.). Based on the analysis of the chip expiration dates 210E stored in card information database 104, computing system 102 may determine an order in which to pull cards 101 from inventory in order to issue cards 101 to users. In some embodiments, the first cards 101 received from suppliers are the first cards 101 pulled from inventory. In other embodiments, cards 101 with the nearest expiration dates are the first cards 101 pulled from inventory. In some embodiments, computing system 102 may display the order in which to pull cards 101 from inventory in a GUI.

In some embodiments, computing system 102 may automatically generate an alert message when it is determined that one or more of chip expiration dates 210E stored in card information database 104 are within a predetermined amount of time of occurring. For example, computing system 102 may send a text message, email message, or any other appropriate message to a user/operator of computing system 102 when certain chip expiration dates 210E are within a certain amount of time from the current time (e.g., within one month, one year, etc.).

In some embodiments, barcode information 210 may be used for additional intelligence regarding a particular type of card 101, a version of chip 111, etc. For example, computing system 102 may perform trend analysis using chip identification 210I and/or chip specification 210J to determine usage trends of a particular version of chip 111 within cards 101. In some embodiments, barcode information 210 from barcode 134 that is specific to a particular chip 111 from a supplier's lot (e.g., job or batch number 210B, component ID or work order number 210K, chip identification 210I, etc.) may enable computing system 102 to identify field and production issues to a much finer scale, thus allowing the supplier to make changes in production quality. This may provide an advantage in that a future reduction in production and customer impact issues may reduce overall expenses.

FIG. 3 is a flowchart of a card imaging and verification method 300, according to certain embodiments. In some embodiments, method 300 may use or may be utilized by all or a portion of card imaging and verification system 100. In some embodiments, method 300 may be implemented by computing system 102 (e.g., using card processing instructions 120) to process barcodes 134 of multiple card sleeves 130 from multiple suppliers.

Method 300 may begin at step 310 where an image of a barcode captured by a vision system is accessed. In some embodiments, the image is image 117 captured by vision system 116. In some embodiments, the barcode is barcode 134. In some embodiments, step 310 alternately includes using a barcode scanner 116 to scan the barcode.

At step 320, barcode information is determined from the image captured in step 310. In some embodiments, the barcode information is barcode information 210. In some embodiments, the barcode information may be determined by scanning the barcode with a barcode scanner.

At step 330, chip information read by a chip reader is accessed. In some embodiments, the chip information is chip information 142. In some embodiments, the chip reader is chip reader 140.

At step 340, it is determined if the chip information accessed in step 330 matches the barcode information of step 320 in order to verify that the barcode information is correct. In some embodiments, one or more items from the barcode information are compared to the chip information. For example, a chip expiration date of the barcode information may be compared to an expiration date of the chip information. In other embodiments, multiple items within the barcode information are compared to the chip information. For example, two or more of items 210A-210K may be compared to corresponding items within the chip information. It should be understood that any appropriate comparison may be made in this step in order to verify the barcode information.

If it is determined in step 340 that the chip information accessed in step 330 matches the barcode information of step 320, some embodiments of method 300 may proceed to step 350. If it is determined in step 340 that the chip information accessed in step 330 does not match the barcode information of step 320, some embodiments of method 300 may end or may send an alert message (e.g., pop message on a GUI, text message, email message, etc.) to alert an operator of the mismatch.

At step 350, method 300 updates a database to include some or all of the barcode information determined in step 320. For example, a database such as card information database 104 may be updated to include chip expiration dates such as chip expiration date 210E. In some embodiments, step 350 is performed only after it is determined in step 340 that the chip information accessed in step 330 matches the barcode information of step 320. In other embodiments, step 350 is performed after step 330 (e.g., regardless of whether or not the chip information accessed in step 330 matches the barcode information of step 320). After step 320, some embodiments of method 300 may end.

Some embodiments of method 300 may include additional steps for inventory control of cards and card sleeves. For example, method 300 may include a step to analyze a plurality of chip expiration dates stored in the database. In some embodiments, each chip expiration date is associated with a particular group of cards from a plurality of groups of cards stored in inventory. In some embodiments, the particular group of cards is a particular card sleeve 130. In some embodiments, this step may involve periodically accessing the database (e.g., hourly, daily, weekly, etc.). In addition method 300 may include a step to determine, based on the analysis of the chip expiration dates stored in the database, an order in which to pull the plurality of groups of cards from the inventory in order to issue cards to users. In some embodiments, this step may involve a FIFO process for the cards.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for card imaging and verification including the particular steps of the method of FIG. 3, this disclosure contemplates any suitable method for card imaging and verification including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, comprising:
    a sleeve of cards comprising a two-dimensional barcode printed on the sleeve, each card within the sleeve of cards comprising an integrated circuit chip;
    a barcode scanner configured to read the two-dimensional barcode printed on the sleeve to capture an image of the two-dimensional barcode;
    a database;
    a chip reader configured to read the integrated circuit chip of each card within the sleeve to retrieve chip information for each card in the sleeve; and
    one or more computer systems operable to:
        access the image of the two-dimensional barcode captured by the barcode scanner;
        determine, using the image of the two-dimensional barcode, barcode information for the sleeve of cards, the barcode information comprising at least a first chip expiration date for all of the cards in the sleeve of cards;
        access particular chip information read by the chip reader for a particular card of the sleeve of cards;
        determine whether the accessed particular chip information read by the chip reader for the particular card matches the barcode information from the two-dimensional barcode;
        update the database to include the first chip expiration date for the sleeve of cards if it is determined that the accessed particular chip information read by the chip reader for the particular card matches the barcode information from the two-dimensional barcode;
        analyze a plurality of chip expiration dates stored in the database, each chip expiration date associated with a particular group of cards from a plurality of groups of cards stored in inventory; and
        determine, based on the analysis of the chip expiration dates stored in the database, that the particular card should be issued before the plurality of groups of cards.

2. The system of claim 1, wherein each card of the sleeve of cards comprises:
    a credit card;
    a debit card;
    a pre-paid card; or
    a gift card.

3. The system of claim 1, wherein:
    the sleeve comprising a label;
    the barcode is located on the label of the sleeve; and
    the label comprises label information printed on the sleeve, the label information comprising one or more of the following:
        a name of a vendor who produced the sleeve of cards;
        an internal plastic number;
        a shelf number associated with a storage location in the inventory for the sleeve of cards;
        a job number associated with production of the sleeve of cards;
        a batch number associated with production of the sleeve of cards;
        a date when sleeve of cards was produced, the date comprising a month and a year;
        a purchase order number associated with an order for the sleeve of cards;
        a written description of the sleeve of cards;
        an application version of the chips of the sleeve of cards;
        a data authentication component for the chips of the sleeve of cards;
        an expiration date of the chips of the sleeve of cards;
        a quantity of cards in the sleeve of cards; and
        a date when the chips of the sleeve of cards were milled into the cards of the sleeve of cards.

4. The system of claim 1, wherein the barcode information further comprises one or more of the following:
    a name of a vendor who produced the sleeve of cards;
    a name of a network associated with the chip of the sleeve of cards;
    an application version of the chips of the sleeve of cards;
    a chip product identification from the vendor who produced the sleeve of cards;
    an amount of memory in each chip of the sleeve of cards;
    a speed of each chip of the sleeve of cards;
    an internal work order number from the vendor who produced the sleeve of cards;
    a job number associated with production of the sleeve p of cards;
    a batch number associated with production of the sleeve of cards;
    a date when sleeve of cards was produced, the date comprising a month and a year;
    a quantity of cards in the sleeve of cards;
    an internal plastic number; and
    a shelf number associated with a storage location in the inventory for the sleeve of cards.

5. The system of claim 1, wherein the one or more computer systems are further operable to:
    receive credentials from a particular user; and
    authenticate the particular user based on the credentials.

6. The system of claim 1, wherein the one or more computer systems are further operable to:
    automatically generate an alert message when it is determined that one or more of the plurality of chip expiration dates stored in the database are within a predetermined amount of time of occurring.

7. The system of claim 1, wherein the one or more computer systems are further operable to display, in a graphical user interface, an order in which to pull the plurality of groups of cards from the inventory.

8. A method, comprising:
by a barcode scanner, scanning a two-dimensional barcode printed on a sleeve of cards to capture an image of the two-dimensional barcode, each card within the sleeve of cards comprising an integrated circuit chip operable to store chip information about the sleeve of cards;
by one or more computer systems, determining, using the scanned barcode, barcode information for the sleeve of cards, the barcode information comprising at least a first chip expiration date for all of the cards in the sleeve of cards;
by the one or more computer systems, accessing particular chip information read by a chip reader for a particular card of the sleeve of cards;
by the one or more computer systems, determining whether the accessed particular chip information read by the chip reader for the particular card matches the barcode information from the two-dimensional barcode;
by the one or more computer systems, updating the database to include the first chip expiration date for the sleeve of cards if it is determined that the accessed particular chip information read by the chip reader for the particular card matches the barcode information from the two-dimensional barcode;
by the one or more computer systems, analyzing a plurality of chip expiration dates stored in the database, each chip expiration date associated with a particular group of cards from a plurality of groups of cards stored in inventory; and
by the one or more computer systems, determining, based on the analysis of the chip expiration dates stored in the database, that the particular card should be issued before the plurality of groups of cards.

9. The method of claim 8, wherein each card of the sleeve of cards comprises:
a credit card;
a debit card;
a pre-paid card; or
a gift card.

10. The method of claim 8, wherein:
the sleeve comprising a label;
the barcode is located on the label of the sleeve; and
the label comprises label information printed on the sleeve, the label information comprising one or more of the following:
a name of a vendor who produced the sleeve of cards;
an internal plastic number;
a shelf number associated with a storage location in the inventory for the sleeve of cards;
a job number associated with production of the sleeve of cards;
a batch number associated with production of the sleeve of cards;
a date when sleeve of cards was produced, the date comprising a month and a year;
a purchase order number associated with an order for the sleeve of cards;
a written description of the sleeve of cards;
an application version of the chips of the sleeve of cards;
a data authentication component for the chips of the sleeve of cards;
an expiration date of the chips of the sleeve of cards;
a quantity of cards in the sleeve of cards; and
a date when the chips of the sleeve of cards were milled into the cards of the sleeve of cards.

11. The method of claim 8, wherein the barcode information further comprises one or more of the following:
a name of a vendor who produced the sleeve of cards;
a name of a network associated with the chip of the sleeve of cards;
an application version of the chips of the sleeve of cards;
a chip product identification from the vendor who produced the sleeve of cards;
an amount of memory in each chip of the sleeve of cards;
a speed of each chip of the sleeve of cards;
an internal work order number from the vendor who produced the sleeve of cards;
a job number associated with production of the sleeve of cards;
a batch number associated with production of the sleeve of cards;
a date when sleeve of cards was produced, the date comprising a month and a year;
a quantity of cards in the sleeve of cards;
an internal plastic number; and
a shelf number associated with a storage location in the inventory for the sleeve of cards.

12. The method of claim 8, further comprising:
by the one or more computer systems, receiving credentials from a particular user; and
by the one or more computer systems, authenticating the particular user based on the credentials.

13. The method of claim 8, further comprising:
by the one or more computer systems, automatically generating an alert message when it is determined that one or more of the plurality of chip expiration dates stored in the database are within a predetermined amount of time of occurring.

14. The method of claim 8, further comprising:
by the one or more computer systems, displaying, in a graphical user interface, an order in which to pull the plurality of groups of cards from the inventory.

15. One or more computer-readable non-transitory storage media embodying software that is operable when executed to:
access an image of a two-dimensional barcode captured by a barcode scanner, the barcode printed on the sleeve of cards, each card of the sleeve of cards comprising an integrated circuit chip operable to store chip information about the sleeve of cards;
determine, using the image of the two-dimensional barcode, barcode information for the sleeve of cards, the barcode information comprising at least a first chip expiration date for all of the cards in the sleeve of cards;
access particular chip information read by a chip reader for a particular card of the sleeve of cards;
determine whether the accessed particular chip information read by the chip reader for the particular card matches the barcode information from the two-dimensional barcode;
update the database to include the first chip expiration date for the sleeve of cards if it is determined that the accessed particular chip information read by the chip reader for the particular card matches the barcode information from the two-dimensional barcode;
analyze a plurality of chip expiration dates stored in the database, each chip expiration date associated with a particular group of cards from a plurality of groups of cards stored in inventory; and determine, based on the analysis of the chip expiration dates stored in the database, that the particular card should be issued before the plurality of groups of cards.

16. The media of claim 15, wherein each card of the sleeve of cards comprises:
   a credit card;
   a debit card;
   a pre-paid card; or
   a gift card.

17. The media of claim 15, wherein:
   the sleeve comprising a label;
   the barcode is located on the label of the sleeve; and
   the label comprises label information printed on the sleeve, the label information comprising one or more of the following:
      a name of a vendor who produced the sleeve of cards;
      an internal plastic number;
      a shelf number associated with a storage location in the inventory for the sleeve of cards;
      a job number associated with production of the sleeve of cards;
      a batch number associated with production of the sleeve of cards;
      a date when sleeve of cards was produced, the date comprising a month and a year;
      a purchase order number associated with an order for the sleeve of cards;
      a written description of the sleeve of cards;
      an application version of the chips of the sleeve of cards;
      a data authentication component for the chips of the sleeve of cards;
      an expiration date of the chips of the sleeve of cards;
      a quantity of cards in the sleeve of cards; and
      a date when the chips of the sleeve of cards were milled into the cards of the sleeve of cards.

18. The media of claim 15, wherein the barcode information further comprises one or more of the following:
      a name of a vendor who produced the sleeve of cards;
      a name of a network associated with the chip of the sleeve of cards;
      an application version of the chips of the sleeve of cards;
      a chip product identification from the vendor who produced the sleeve of cards;
      an amount of memory in each chip of the sleeve of cards;
      a speed of each chip of the sleeve of cards;
      an internal work order number from the vendor who produced the sleeve of cards;
      a job number associated with production of the sleeve of cards;
      a batch number associated with production of the sleeve of cards;
      a date when sleeve of cards was produced, the date comprising a month and a year;
      a quantity of cards in the sleeve of cards;
      an internal plastic number; and
      a shelf number associated with a storage location in the inventory for the sleeve of cards.

19. The media of claim 15, the software further operable when executed to:
   receive credentials from a particular user; and
   authenticate the particular user based on the credentials.

20. The media of claim 15, the software further operable when executed to:
   automatically generate an alert message when it is determined that one or more of the plurality of chip expiration dates stored in the database are within a predetermined amount of time of occurring.

* * * * *